United States Patent [19]

Morris et al.

[11] 4,059,289

[45] Nov. 22, 1977

[54] WASTE DRAIN CONNECTION

[75] Inventors: Earl Lavern Morris, Whittier; Larry Fields, La Puente, both of Calif.

[73] Assignee: Acorn Engineering Company, City of Industry, Calif.

[21] Appl. No.: 722,104

[22] Filed: Sept. 10, 1976

[51] Int. Cl.² .......................................... F16L 21/04
[52] U.S. Cl. ................................... 285/56; 285/343; 277/180
[58] Field of Search ....................... 285/56, 58, 59, 60, 285/343, 372; 277/180; 4/252 R

[56] References Cited

U.S. PATENT DOCUMENTS

| 1,631,654 | 6/1927 | Stoffel ................................. 285/343 |
| 3,197,242 | 7/1965 | Milette ............................. 285/343 X |
| 3,409,918 | 11/1968 | Gaddy ................................... 285/58 |

FOREIGN PATENT DOCUMENTS

| 1,535,637 | 7/1968 | France ................................. 285/343 |
| 1,185,766 | 3/1970 | United Kingdom ................. 285/343 |

*Primary Examiner*—Werner H. Schroeder
*Assistant Examiner*—Conrad L. Berman
*Attorney, Agent, or Firm*—Ben E. Lofstedt

[57] ABSTRACT

A waste drain connection for coupling the waste outlet of a plumbing fixture having a receptacle for a fluid-sealing gasket thereabout to a plumbing drain pipe including a fluid-sealing member having a sleeve portion adapted for intimate fluid-sealing about the plumbing drain pipe and an outwardly-extending flange forming a gasket about one end thereof and a sleeve and gasket compression member for containing the sleeve and for compressively urging the sleeve into greater intimate contact with the plumbing drain pipe to ensure a fluid sealing relationship therebetween and for compressively urging the gasket into intimate contact with the gasket receptacle to effectuate a fluid sealing relationship therebetween.

13 Claims, 3 Drawing Figures

WASTE DRAIN CONNECTION

BACKGROUND OF THE INVENTION

1. Field of the Invention

The present invention relates to the field of waste drain connections for coupling the waste outlets of plumbing fixtures to the inlets of plumbing drains.

2. Description of the Prior Art

Waste drain connections for coupling the waste outlets of plumbing fixtures to plumbing drains typically found in the prior art rigidly couple the body of the compression ring and alignment yoke directly to the pipe employed to connect the waste outlet of a plumbing fixture, typically a toilet or water closet outlet, to the plumbing drain pipe. Such rigid and direct connections are exemplified by U.S. Pat. Nos. 1,988,298 (Burkett) and 2,208,199 (Sisk).

U.S. Pat. No. 1,988,298 employs an annular lead washer 28 disposed in between the exterior surface of the wall of the outlet pipe 12 and the interior surface of the wall of the pipe section 24 which is, in turn, coupled to the main outlet pipe. To form a fluid tight connection between these pipes, the lead washer 28 must be crushed so that it will be forced tightly against the pipe 12 and the threads 25 of pipe 24.

With regards to U.S. Pat. No. 2,208,199, a simple and direct threaded coupling is employed to effectuate a similar fluid tight seal between the coupling pipe and the main outlet pipe.

The major problems associated with such fluid tight waste connections are high cost, time-consuming installation of such joints since such installations are performed in the field by "wiping". Further, such connections are rigid and because of this rigidity misalignment poses a number of problems. Should radial axial misalignment exist prior to installation, such misalignment will not permit the formation of a fluid tight seal between the pipes. If the misalignment occurs following installation due to the relative movement between the pipes, loss of the fluid tight seal will result either because of the breakage of either or both pipes or because of seal breakage or causing the seal material, usually lead, to be permanently upset, thereby creating a fluid passageway between the seal and the pipes.

Similar problems are associated with the prior art arrangements disclosed in U.S. Pat. Nos. 1,490,805 (Divekey), 1,706,285 (Frye), and 3,409,918 (Gaddy).

In reviewing such examples, it may be readily seen that such assemblies are relatively complex, expensive to construct and require a relatively lengthy period of time to install.

SUMMARY OF THE INVENTION AND OBJECTS

Fundamentally, the present invention comprises a waste drain connection for coupling the waste outlet of a plumbing fixture having a receptacle for a fluid-sealing gasket thereabout to a plumbing drain pipe including a fluid-sealing member having a sleeve portion adapted for intimate fluid-sealing about the plumbing drain pipe and an outwardly-extending flange forming a gasket about one end thereof and a sleeve and gasket compression member for containing the sleeve and for compressively urging the sleeve into greater intimate contact with the plumbing drain pipe to ensure a fluid sealing relationship therebetween and for compressively urging the gasket into intimate contact with the gasket receptacle to effectuate a fluid sealing relationship therebetween.

An object of the present invention is to provide an inexpensive, labor-saving apparatus for effectuating the connection of the waste outlet of a plumbing fixture, such as a toilet, to a plumbing drain pipe.

Another important and primary object of the instant invention is to provide a slip joint type of plumbing pipe drain connection which allows for a relatively substantial longtitudinal variation between the waste outlet of the plumbing fixture and the plumbing drain pipe.

A yet still further and important object of the present invention is to provide a waste drain connection which permits a rather substantial amount of angular misalignment between the waste outlet of a plumbing fixture and the plumbing drain pipe linked by the present invention herein.

Another primary and significant object of the invention is to provide a waste drain connection which substantially eliminates the problems inherent in rigid joint waste drain connections.

A yet still further object of the present invention is to provide a waste drain connection which assures a permanent gas and water tight seal even under adverse conditions of pipe movement and field conditions such as axial and radial misalignment.

Other characteristics, advantages and objects of this invention can be more readily appreciated from the following description and appended claims. When taken in conjunction with the accompanying drawings, this description forms a part of the specification wherein like references and characters designate corresponding parts in several views.

DESCRIPTION OF THE PREFERRED EMBODIMENT

Figure 1:
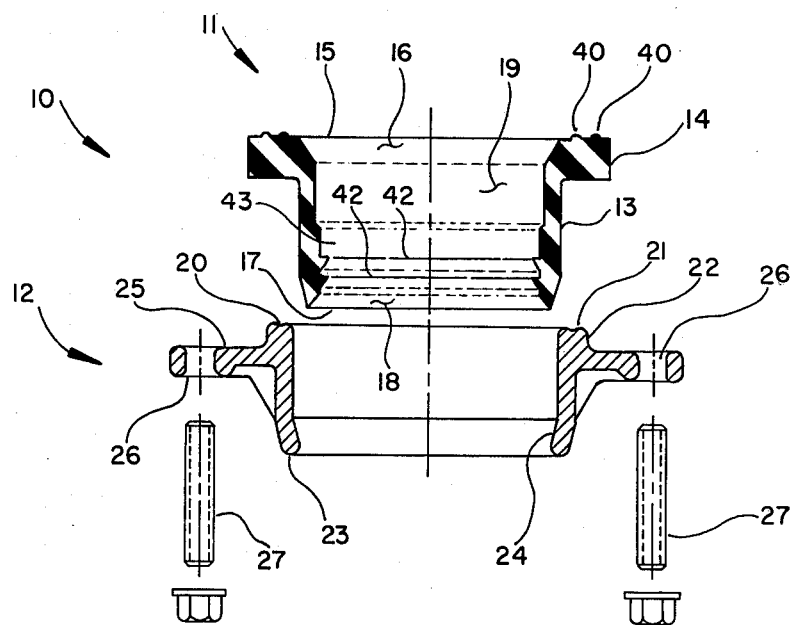
FIG. 1 is an exploded assembly view of the various elements forming the present invention.

With continued reference to the drawings, and, in particular, now to FIG. 1, the present invention is generally indicated at 10, comprising a fluid sealing member, generally indicated at 11, and a sleeve and gasket compression member, generally indicated at 12. As is clearly shown and illustrated in this exploded assembly view, the sleeve and gasket compression member 12 is adapted to be arranged about the body of the fluid sealing member 11.

The fluid sealing member 11 is characterized by numerous and diverse functional portions which are further pointed out and described herein. The body of the fluid sealing member 11 is preferably formed of an elastomeric material, such as 50 shore hardness Neoprene, and basically comprises two portions: a sleeve portion 13 and a flange portion 14 adapted to function, as hereinafterwards described, as a gasket. While the inside diametered portion of the fluid sealing member 11 has a relatively constant and uniform cross-section, the outside diametered portion of the fluid sealing member 11 does not have such a relatively uniform and constant cross-section. The outside diameter of the fluid sealing member 11 is divided into two basic portions, one of which is larger than the other. The largest diametered portion defines the flange portion 14 which functions as a fluid-sealing gasket. A pair of outwardly-projecting rings 40 are cast into the face of the flange portion 14 act to improve the fluid-sealing surface thereof when compressively engaged with the gasket receptacle as hereinafterwards described. The smaller outside diametered portion defines the sleeve portion 13 of the fluid sealing member 11. The inside diameter of the fluid sealing member, while being relatively uniform, is, nevertheless, characterized by the following sections. The rim 15 of the flange portion 14, in this particular embodiment of the invention, adjacent the inside diameter thereof, is chamfered at 16. The purpose of this chamfered portion 16 will be described as the discussion of the invention proceeds herein.

The opposite rim 17 is similarly beveled at 18. About the inside diametered portion adjacent to the flange portion 14 is a first annular groove 19 and a second shallower annular groove 43, the purposes of which will become readily known and understood as the disclosure of the invention further unfolds hereinafterwards. A pair of rings 42 ringing the annular raised portion 43 cast into the sleeve portion 13 act to improve the fluid sealing surface thereof when compressively engaged as hereinafterwards described.

The sleeve and gasket compression member 12 includes an annular groove 20 about the edge 21 of the rim 22 of the member 12 facing the flange portion 14 which forms the face which functions as the gasket compressing portion of the member 12. The inside diameter of the member 12 is slightly larger than the smaller outside diametered portion of the fluid sealing member 11 which defines the sleeve portion 13 thereof to allow it to fit over the sleeve portion 13 of the fluid sealing member 11. The inside diametered portion of the member 12 adjacent to the other rim 23 of the member 12 is uniformly reduced or tapered at 24. The purpose of this taper 24 will become readily apparent later in the discussion. Ringing the outside of the member 12 is an outwardly extending ring 25. The ring 25 has at least two apertures 26 therein through which pass a pair of threaded rods 27. Generally, it is preferred that such apertures are disposed on opposite sides of the member 12.

Figures 2, 3:
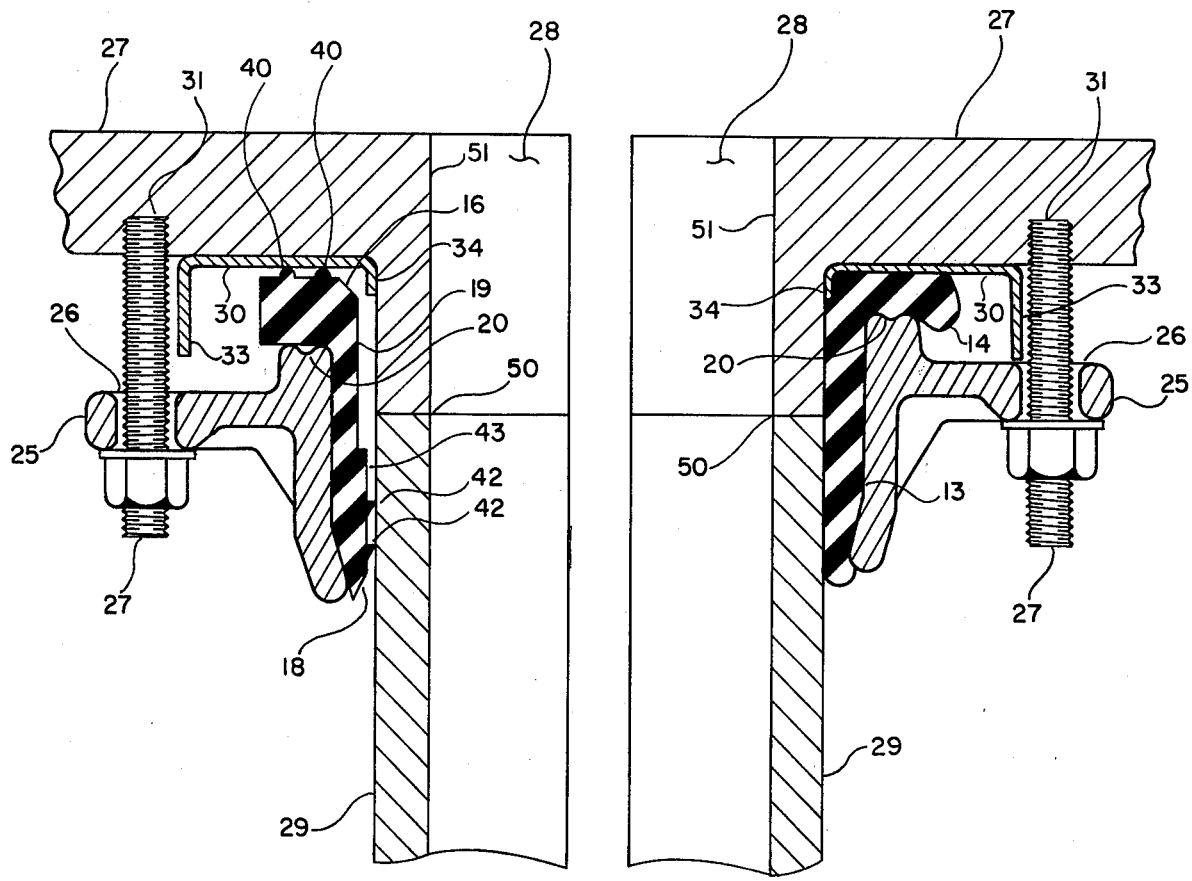
FIG. 2 is a transverse sectional view of a portion of the present invention shown assembled.
FIG. 3 is a transverse sectional view of a portion of the present invention shown assembled and compressively engaged with the sealing member to ensure a fluid sealing relationship between the waste outlet of the plumbing fixture and the plumbing drain pipe.

Turning our attention now to FIG. 2, the present invention is depicted in an installed configuration. The plumbing fixture is partially and representatively shown in section at 27. The waste outlet of the plumbing fixture is identified at 28, the waste outlet 28 being the outlet from which the fluid and solid effluent is expelled from the plumbing fixture 27. As illustrated, the waste outlet 28 has a rearwardly projecting annular rim forming a pipe which is virtually identical to plumbing drain pipe 29. The plumbing drain pipe 29 is slideably coupled with the sleeve portion 13 of the fluid sealing member 12 along the inside diametered portion thereof. The plumbing drain pipe 29 is then positioned in abutting, edge-to-edge relationship with the rim of the waste outlet 28. In so doing, the joint formed at 50 presents a smooth, uninterrupted inside surface to minimize the resistance thereof to the passage of the effluent thereover. Such is termed in the plumbing trade a "sanitary pipe connection".

The flange portion 14 is disposed in the gasket receptacle 30 having a U-shaped cross-section with an outer sidewall 33 which is longer than the inner sidewall 34 and which is annularly disposed about the waste outlet 28 of the plumbing fixture 27 and faces rearwardly thereof. The threaded rods 27 (only one is shown in FIG. 2) and threadably secured to the plumbing fixture 27 via the threaded receptacles 31 (only one is shown) and the body of the rods 27 are passed through the apertures 26 in the ring 25. Nuts 32 are used to anchor the ring 25 of the member 12 to the plumbing fixture 27 and to adjustably move the rim 22 containing the annular groove 20 against the flange portion 14 which forms the gasket and to compress it as shown and depicted in FIG. 3. As the flange 14 is compressed it may be readily seen that the annular groove 20 forms a ridged surface which prevents radial slippage of the gasket thereby formed and which effectively captures the gasket by compressively holding it within the gasket receptacle 30. The chamfered portion 16 is now seen as permitting engagement with the edge of the smaller sidewall 34 with the fluid sealing member 11 and permits the elastomeric material to be moved into the void previously existing prior to compressive deformation between the chamfered portion 16 and the gasket receptacle 30. However, it should be clearly understood and noted at this time that the chamfered portion 16 is not an essential part of this invention and should not be construed as being a limitation thereon in any way. A similar function and event occurs relative to the annular groove 19 and that portion of the plumbing drain pipe 29 which is coextensive therewith.

As the flange 14 is compressed, the tapered portion 24 about the inside diametered portion of the member 12 is also drawn towards the gasket receptacle 30. Due to this effectively reduced diametered portion, the rim 17 of the sleeve portion 13 acts to compressively urge the sleeve into more intimate fluid sealing relationship with the plumbing drain pipe 29 and the sleeve portion 13 of the fluid sealing member 11.

It should be noted at this time that the compression desired is approximately twenty-five percent of the original uncompressed thickness of the gasket portion 14. To prevent over-compression of the flange portion 14 and possible breakage and subsequent leakage of fluid therebetween, the edge of the outer sidewall 33 of the gasket receptacle 30 serves as a physical stop to limit the movement of the ring 25, and, hence, the entire sleeve and gasket compression member 12, to prevent such over-compression of the fluid sealing member 11.

The result is an effective waste drain connection which is capable of radial, axial and angular misalignment over a relatively wide range as compared to those waste connections used hereinbefore.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

We claim:

1. Apparatus for coupling the waste outlet of a plumbing fixture to a plumbing drain pipe in fluid communication and for effecting a fluid sealing relationship therewith, wherein the waste outlet of said plumbing fixture has an annular gasket-receiving receptacle thereabout, comprising:
  a. a fluid sealing member of elastic material having a tubular portion adapted to form a sleeve for intimate engagement about the exterior of said drain pipe and further having an outwardly-extending flange adapted to form a gasket for fluid sealing disposition within said gasket receptacle; and
  b. a sleeve and gasket compression member of non-elastic material having a through bore wherein said tubular portion of said fluid sealing member is mounted and one end of sleeve and gasket compression member is disposed in abutting relationship to said gasket of said fluid sealing member; and
  c. means on said sleeve and gasket compression member for mounting said sleeve and gasket compression member to said plumbing fixture and for cooperatively effecting a corresponding alignment of said bore with said waste outlet of said plumbing fixture;
  d. means on said sleeve and gasket compression member for adjusting the axial displacement of said sleeve and gasket compression member relative to said fluid sealing member after said sleeve and gasket compression member has been mounted to said plumbing fixture to adjustingly effect fluid sealing engagement between said one end of said sleeve and gasket compression member and said flange of said fluid sealing member and said gasket receptacle of said plumbing fixture; and
  e. means about said through bore and the other end of said sleeve and gasket compression member for deforming said sleeve into gripping and sealing engagement with said plumbing drain pipe in response to axial displacement of said sleeve and gasket compression member with said fluid sealing member.

2. The apparatus of claim 1 wherein said elastic material is 50 shore Neoprene.

3. The apparatus of claim 1 wherein the rim of said gasket compression portion of said sleeve and gasket compression member facing said gasket portion of said fluid sealing member has an annular groove thereabout.

4. The apparatus of claim 1 wherein said inside diameter of said sleeve compression portion of said sleeve and gasket compression member is smaller in diameter than the inside diameter of the rim of said gasket compression portion of said sleeve and gasket compression member.

5. The apparatus of claim 1 wherein said fluid sealing member has a first annular groove about the inside of said sleeve disposed adjacent to said gasket portion.

6. The apparatus of claim 5 wherein said gasket portion of said fluid sealing member has an outer diameter larger than the outer diameter of said gasket compression portion of said sleeve and gasket compression member.

7. The apparatus of claim 6 wherein said gasket portion of said fluid sealing member has a chamfered surface about the inside rim thereof.

8. The apparatus of claim 7 wherein the inside of the rim of said sleeve portion of said fluid sealing member is beveled.

9. The apparatus of claim 8 wherein said fluid sealing member has an annular raised portion about the inside of said sleeve intermediate said first annular groove and the rim of said sleeve portion including a pair of spaced-apart, inwardly projecting rings cast into said fluid sealing member to ensure the effectuation of a fluid sealing relationship between said plumbing drain pipe and said fluid sealing member.

10. The apparatus of claim 1 wherein said sleeve and gasket compression member further comprises an annular, outwardly-extending ring thereabout with at least two apertures therethrough.

11. The apparatus of claim 10 wherein said at least two apertures are oppositely-disposed on either side of said ring.

12. The apparatus of claim 11, further comprising a pair of threaded rods, one end of which is anchored to said plumbing fixture about said gasket receptacle in alignment with said at least two apertures and a pair of nuts threadably securable with the other ends of said threaded rods.

13. A coupling for connecting the end of a pipe to the end of another pipe having a flanged portion thereabout disposed away from the end thereof, comprising:
  a. a pair of coupling members having through bores and mounted one within the bore of the other for relative axial movement therebetween, including an outer coupling member formed of non-elastic material and an inner coupling member formed of elastic material, the inner coupling member further comprising a sealing sleeve portion disposed within the bore of the outer coupling member so as to be deformable thereto, the sleeve being adapted to receive therein the end portions of the pipes to be coupled together and a flange portion disposed about one of the ends of the sealing sleeve and extending outwardly therefrom and beyond the external diameter of the outer coupling member and arranged in adjacent disposition to the end of the outer coupling member;
  b. means on the outer coupling member providing for nonrotative mounting thereof to the flanged portion of the other pipe and for relative axial movement between the inner and outer couplings; and
  c. means about the inner bore of the outer coupling member and the sleeve of the inner coupling member for cooperably deforming the sleeve into gripping and fluid sealing engagement about the pipes to be coupled together and for cooperably deforming the flange portion of the inner coupling member into gripping and fluid sealing engagement with the flanged portion of the one of the pipes to be coupled in response to axial movement of the outer coupling member and the inner coupling member.

* * * * *